United States Patent
Watanabe et al.

(10) Patent No.: US 11,798,707 B2
(45) Date of Patent: Oct. 24, 2023

(54) COPPER MICROPARTICLES

(71) Applicant: NISSHIN ENGINEERING INC., Tokyo (JP)

(72) Inventors: Shu Watanabe, Fujimino (JP); Shiori Sueyasu, Fujimino (JP); Keitaroh Nakamura, Fujimino (JP)

(73) Assignee: NISSHIN ENGINEERING INC., Tokyo (JP)

(*) Notice: Subject to any disclaimer, the term of this patent is extended or adjusted under 35 U.S.C. 154(b) by 126 days.

(21) Appl. No.: 16/961,612

(22) PCT Filed: Jan. 10, 2019

(86) PCT No.: PCT/JP2019/000496
§ 371 (c)(1),
(2) Date: Jul. 10, 2020

(87) PCT Pub. No.: WO2019/146414
PCT Pub. Date: Aug. 1, 2019

(65) Prior Publication Data
US 2020/0368811 A1    Nov. 26, 2020

(30) Foreign Application Priority Data
Jan. 26, 2018    (JP) .................................. 2018-011479

(51) Int. Cl.
*H01B 1/02* (2006.01)
*B22F 3/02* (2006.01)
(Continued)

(52) U.S. Cl.
CPC .............. *H01B 1/02* (2013.01); *B22F 1/054* (2022.01); *B22F 1/102* (2022.01); *B22F 1/142* (2022.01);
(Continued)

(58) Field of Classification Search
None
See application file for complete search history.

(56) References Cited

U.S. PATENT DOCUMENTS

| 2007/0084308 A1* | 4/2007 | Nakamura | B22F 9/14 75/346 |
| 2012/0003465 A1* | 1/2012 | Rittner | H01L 24/29 428/323 |

(Continued)

FOREIGN PATENT DOCUMENTS

| CN | 103180072 A | 6/2013 |
| CN | 104259455 A | 1/2015 |

(Continued)

OTHER PUBLICATIONS

The Chemical Company; (Lauric Acid); (https://thechemco.com/chemical/lauric-acid/accessed Feb. 25, 2022) (Year: 2022).*

(Continued)

*Primary Examiner* — Elizabeth Collister
(74) *Attorney, Agent, or Firm* — Muncy, Geissler, Olds & Lowe, P.C.

(57) ABSTRACT

Provided are copper microparticles which have exceptional oxidation resistance, in which oxidation is reduced even when the copper microparticles are held at a firing temperature in an oxygen-containing atmosphere, and in which sintering also occurs. The copper microparticles have a particle diameter of 10-100 nm, have a surface coating material, and are such that, after the copper microparticles are held for one hour at a temperature of 400° C. in an oxygen-containing atmosphere, the particle diameter exceeds 100 nm while a copper state is retained.

4 Claims, 5 Drawing Sheets

(51) Int. Cl.
  *B22F 1/054* (2022.01)
  *B22F 1/142* (2022.01)
  *B22F 1/102* (2022.01)
  *B22F 9/12* (2006.01)

(52) U.S. Cl.
  CPC ............ *B22F 3/02* (2013.01); *B22F 9/12* (2013.01); *B22F 2301/10* (2013.01); *B22F 2304/054* (2013.01)

(56) References Cited

U.S. PATENT DOCUMENTS

| | | |
|---|---|---|
| 2013/0248775 A1 | 9/2013 | Kurihara |
| 2017/0043404 A1* | 2/2017 | Fukumoto ............... B22F 1/102 |
| 2017/0073538 A1* | 3/2017 | Kawasaki ............... B22F 1/102 |
| 2018/0029121 A1* | 2/2018 | Urashima ................ B22F 1/16 |
| 2020/0131392 A1* | 4/2020 | Kawasaki ............... B22F 1/054 |

FOREIGN PATENT DOCUMENTS

| | | |
|---|---|---|
| CN | 106457407 A | 2/2017 |
| JP | 2007-138287 A | 6/2007 |
| JP | 2007-254841 A | 10/2007 |
| JP | 2010-189681 A | 9/2010 |
| JP | 2012-514060 A | 6/2012 |
| JP | 2013047365 A | 3/2013 |
| JP | 2014-001443 A | 1/2014 |
| JP | 2015-227476 A | 12/2015 |
| JP | 2016-014181 A | 1/2016 |
| JP | 2016-071629 A | 5/2016 |

OTHER PUBLICATIONS

Yokoyama et al., Aqueous electrophoretic deposition of citric-acid-stabilized copper nanoparticles, Colloids and Surfaces A: Physicochemical and Engineering Aspects, vol. 545, pp. 93-100 (Year: 2018).*
Deng et al., Copper Nanoparticles: Aqueous Phase Synthesis and Conductive Films Fabrication at Low Sintering Temperature, ACS Appl. Mater. Interfaces 2013, 5, 9, pp. 3839-3846 (Year: 2013).*
Barbooti et al., Thermal Decomposition of Citric Acid, (1986), Thermochimica Acta, 98, pp. 119-126. (Year: 1986).*
Deng et al., "Copper Nanoparticles: Aqueous Phase Synthesis and Conductive Films Fabrication at Low Sintering Temperature," Applied Materials & Interfaces, 2013, vol. 5, pp. 3839-3846, 8 pages.

* cited by examiner

COPPER MICROPARTICLES

TECHNICAL FIELD

The present invention relates to nanosized copper fine particles with a particle size of 10 to 100 nm, particularly to copper fine particles having excellent oxidation resistance and excellent sintering properties.

BACKGROUND ART

At present, various types of fine particles are used in various applications. For instance, fine particles such as metal fine particles, oxide fine particles, nitride fine particles and carbide fine particles have been used in electrical insulation materials for various electrical insulation parts, cutting tools, materials for machining tools, functional materials for sensors, sintered materials, electrode materials for fuel cells, and catalysts.

Meanwhile, the use of touch panels in which a display device such as a liquid crystal display device is combined with a touch panel for tablet computers, smartphones and other devices, has become popular. As one touch panel, a touch panel having an electrode made of metal has been proposed.

For instance, a touch panel described in Patent Literature 1 has an electrode for touch panels that is constituted of conductive ink. A silver ink composition is mentioned as an example of the conductive ink.

For touch panels required to have flexibility, substrates therein need to be flexible, so that the use of a general-purpose resin such as PET (polyethylene terephthalate) or PE (polyethylene) is required. When a general-purpose resin such as PET or PE is used for a substrate, since its heat resistance is lower than that of glass or ceramics, an electrode needs to be formed at lower temperatures. For instance, Patent Literature 2 describes a copper fine particle material that is sintered by heating at 150° C. or lower in a nitrogen atmosphere and has electric conductivity.

CITATION LIST

Patent Literature

Patent Literature 1: JP 2016-71629 A
Patent Literature 2: JP 2016-14181 A

SUMMARY OF INVENTION

Technical Problems

It is known that copper is easily oxidized. For copper, it is necessary to take oxidation resistance into account, and the preservability in air is considered in Patent Literature 2.

Copper fine particles are usually sintered by heating, and in Patent Literature 2, are sintered in a nitrogen atmosphere. In the case of sintering in a nitrogen atmosphere, it is necessary to increase the concentration of nitrogen in order to prevent oxygen from being included. In this case, the use of high-purity nitrogen gas is required, and it leads to a high cost; however, the inclusion of oxygen in a nitrogen atmosphere is not considered in Patent Literature 2. In Patent Literature 2, oxidation of copper fine particles when they are retained at a sintering temperature in an oxygen-containing atmosphere is not considered at all. Thus, there are no such copper fine particles that are produced taking into account oxidation resistance and sintering properties of the particles retained at a baking temperature in an oxygen-containing atmosphere, in the present situation.

The present invention has been made to solve the problem that may arise from the conventional art, and an object of the invention is to provide copper fine particles that have excellent oxidation resistance, so that even when the particles are retained at a baking temperature in an oxygen-containing atmosphere, their oxidation is suppressed while the particles are sintered.

Solution to Problems

In order to attain the above object, the present invention provides copper fine particles with a particle size of 10 to 100 nm and having surface coating, wherein when the copper fine particles are retained in an oxygen-containing atmosphere at a temperature of 400° C. for 1 hour, the particle size of the copper fine particles exceeds 100 nm while a copper condition is maintained.

Preferably, the particle size is 10 to 90 nm.

Preferably, when the copper fine particles are baked in a nitrogen atmosphere with an oxygen concentration of 3 ppm, not less than 60 wt % of the surface coating is removed at 350° C.

For instance, the surface coating is constituted of an organic substance generated by thermal decomposition of an organic acid.

Preferably, the organic acid consists only of C, O and H.

Preferably, the organic acid is at least one of L-ascorbic acid, formic acid, glutaric acid, succinic acid, oxalic acid, DL-tartaric acid, lactose monohydrate, maltose monohydrate, maleic acid, D-mannite, citric acid, malic acid and malonic acid. Of these, the organic acid is citric acid, for instance.

Preferably, when a pellet is made by pressing the copper fine particles at 127 MPa for 1 minute and retained in an oxygen-containing atmosphere at a temperature of 300° C. for 1 hour, a volume resistivity of the pellet becomes not more than $4.0 \times 10^3$ (Ωcm).

Preferably, the oxygen-containing atmosphere is a nitrogen atmosphere with an oxygen concentration of 3 to 100 ppm.

Advantageous Effects of Invention

The present invention makes it possible to obtain copper fine particles that have excellent oxidation resistance, so that even when the particles are retained at a baking temperature in an oxygen-containing atmosphere, their oxidation is suppressed while the particles are sintered.

DESCRIPTION OF EMBODIMENTS

A method of producing copper fine particles and copper fine particles according to the present invention are described below in detail with reference to preferred embodiments shown in the accompanying drawings.

One example of the method of producing copper fine particles according to the invention is described below.

Figure 1:
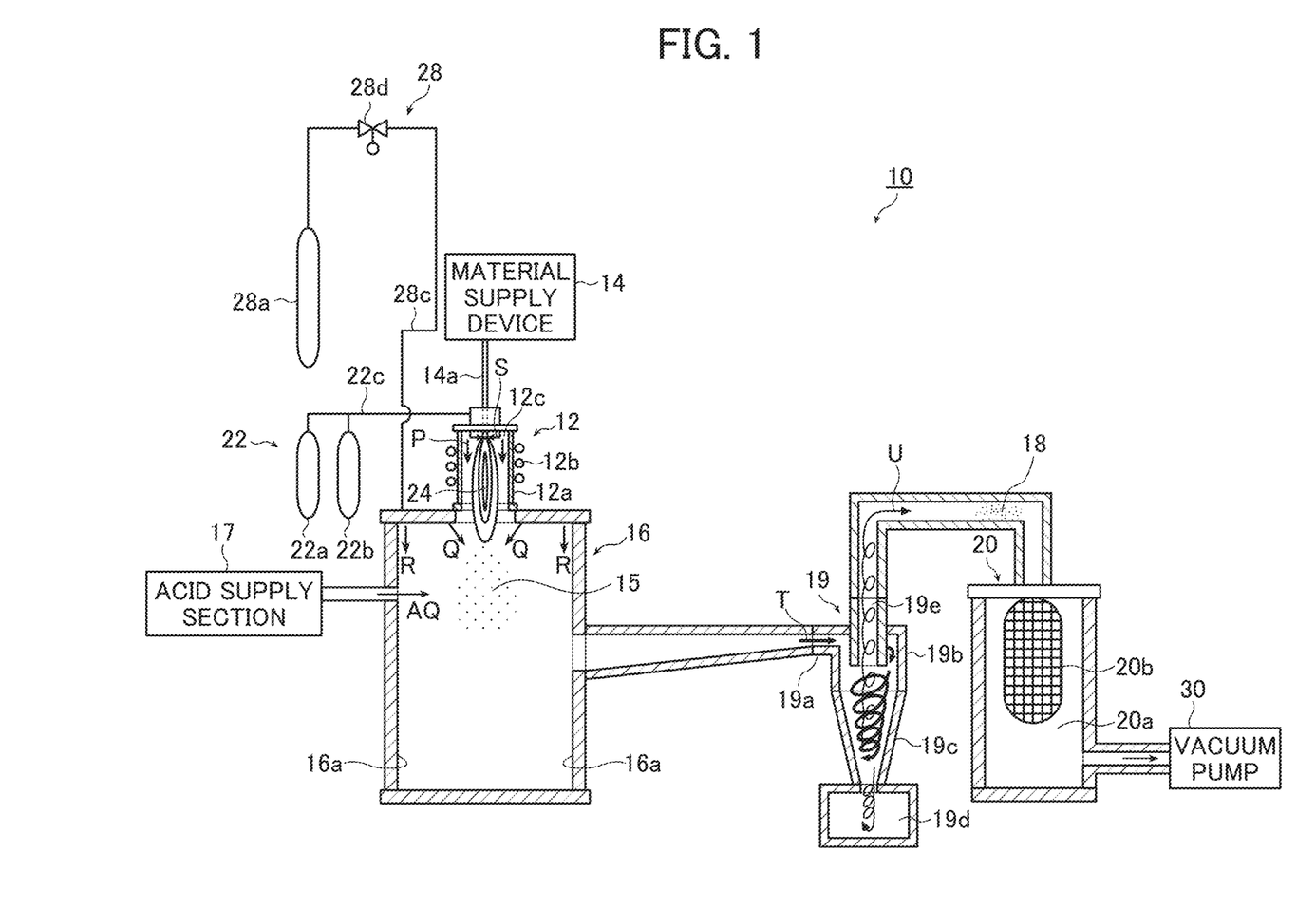
FIG. 1 is a schematic view showing an example of a fine particle production apparatus that is used in a method of producing copper fine particles according to the invention.

FIG. 1 is a schematic view showing an example of a fine particle production apparatus that is used in the method of producing copper fine particles according to the invention.

A fine particle production apparatus 10 (hereinafter referred to simply as "production apparatus 10") shown in FIG. 1 is used to produce copper fine particles.

The production apparatus 10 includes a plasma torch 12 generating thermal plasma, a material supply device 14 supplying raw material powder of the copper fine particles into the plasma torch 12, a chamber 16 serving as a cooling tank for use in producing primary fine particles 15 of copper, an acid supply section 17, a cyclone 19 removing, from the produced primary fine particles 15 of copper, coarse particles having a particle size equal to or larger than an arbitrarily specified particle size, and a collecting section 20 collecting secondary fine particles 18 of copper having a desired particle size as obtained by classification by the cyclone 19. The primary fine particles 15 of copper before an organic acid is supplied are particles in the middle of the production process of the copper fine particles of the invention, and the secondary fine particles 18 of copper is equivalent to the copper fine particles of the invention.

Various devices in, for example, JP 2007-138287 A may be used for the material supply device 14, the chamber 16, the cyclone 19 and the collecting section 20. The primary fine particles 15 of copper are also simply called primary fine particles 15.

In this embodiment, copper powder is used as the raw material powder in production of the copper fine particles. The average particle size of copper powder is appropriately set to allow easy evaporation of the powder in a thermal plasma flame. The average particle size is measured by a laser diffraction method and is, for example, not more than 100 μm, preferably not more than 10 μm, and more preferably not more than 5 μm.

The plasma torch 12 is constituted of a quartz tube 12a and a coil 12b for high frequency oscillation surrounding the outside of the quartz tube. A supply tube 14a to be described later which is for supplying raw material powder of the copper fine particles into the plasma torch 12 is provided on the top of the plasma torch 12 at the central part thereof. A plasma gas supply port 12c is formed in the peripheral portion of the supply tube 14a (on the same circumference). The plasma gas supply port 12c is in a ring shape.

A plasma gas supply source 22 is configured to supply plasma gas into the plasma torch 12 and for instance has a first gas supply section 22a and a second gas supply section 22b. The first gas supply section 22a and the second gas supply section 22b are connected to the plasma gas supply port 12c through piping 22c. Although not shown, the first gas supply section 22a and the second gas supply section 22b are each provided with a supply amount adjuster such as a valve for adjusting the supply amount. Plasma gas is supplied from the plasma gas supply source 22 into the plasma torch 12 through the plasma gas supply port 12c of ring shape in the direction indicated by arrow P and the direction indicated by arrow S.

For example, mixed gas of hydrogen gas and argon gas is used as plasma gas. In this case, hydrogen gas is stored in the first gas supply section 22a, while argon gas is stored in the second gas supply section 22b. Hydrogen gas and argon gas are supplied from the first gas supply section 22a and the second gas supply section 22b of the plasma gas supply source 22, respectively, into the plasma torch 12 in the direction indicated by arrow P and the direction indicated by arrow S after passing through the plasma gas supply port 12c via the piping 22c. Argon gas may be solely supplied in the direction indicated by arrow P.

When a high frequency voltage is applied to the coil 12b for high frequency oscillation, a thermal plasma flame 24 is generated in the plasma torch 12.

It is necessary for the thermal plasma flame 24 to have a higher temperature than the boiling point of the raw material powder. A higher temperature of the thermal plasma flame 24 is more preferred because the raw material powder is more easily converted into a gas phase state; however, there is no particular limitation on the temperature. For instance, the thermal plasma flame 24 may have a temperature of 6,000° C., and in theory, the temperature is deemed to reach around 10,000° C.

The ambient pressure inside the plasma torch 12 is preferably up to atmospheric pressure. The ambient pressure of up to atmospheric pressure is not particularly limited and is, for example, in the range of 0.5 to 100 kPa.

The periphery of the quartz tube 12a is surrounded by a concentrically formed tube (not shown), and cooling water is circulated between this tube and the quartz tube 12a to cool the quartz tube 12a with the water, thereby preventing the quartz tube 12a from having an excessively high temperature due to the thermal plasma flame 24 generated in the plasma torch 12.

The material supply device 14 is connected to the top of the plasma torch 12 through the supply tube 14a. The material supply device 14 is configured to supply the raw material powder in a powdery form into the thermal plasma flame 24 in the plasma torch 12, for example.

For example, as described above, the device disclosed in JP 2007-138287 A may be used as the material supply device 14 that supplies copper powder in a powdery form as the raw material powder. In this case, the material supply device includes, for example, a storage tank (not shown) storing copper powder, a screw feeder (not shown) transporting the copper powder in a fixed amount, a dispersion section (not shown) dispersing the copper powder to convert it into the state of primary particles before the copper powder transported by the screw feeder is finally sprayed, and a carrier gas supply source (not shown).

Together with a carrier gas to which push-out pressure is applied from the carrier gas supply source, the copper powder is supplied into the thermal plasma flame 24 in the plasma torch 12 through the supply tube 14a.

The configuration of the material supply device 14 is not particularly limited as long as the device prevents the copper powder from agglomerating, thus making it possible to spray the copper powder into the plasma torch 12 with the dispersed state maintained. Inert gas such as argon gas is used as the carrier gas, for example. The flow rate of the carrier gas can be controlled using, for instance, a flowmeter such as a float type flowmeter. The flow rate value of the carrier gas refers to a reading on the flowmeter.

The chamber 16 is provided below and adjacent to the plasma torch 12, and a gas supply device 28 is connected to the chamber 16. The primary fine particles 15 of copper are produced in the chamber 16. The chamber 16 also serves as a cooling tank.

The gas supply device 28 is configured to supply cooling gas into the chamber 16. The gas supply device 28 includes a first gas supply source 28a and piping 28c, and further includes a pressure application means (not shown) such as a compressor or a blower which applies push-out pressure to the cooling gas to be supplied into the chamber 16. The gas supply device 28 is also provided with a pressure control valve 28d which controls the amount of gas supplied from the first gas supply source 28a. For example, the first gas supply source 28a stores argon gas. In this case, the cooling gas is argon gas.

The gas supply device 28 supplies argon gas as the cooling gas at, for example, 45 degrees in the direction of arrow Q toward a tail portion of the thermal plasma flame 24, i.e., the end of the thermal plasma flame 24 on the opposite side from the plasma gas supply port 12c, that is, a terminating portion of the thermal plasma flame 24, and also supplies the cooling gas from above to below along an inner wall 16a of the chamber 16, that is, in the direction of arrow R shown in FIG. 1.

The cooling gas supplied from the gas supply device 28 into the chamber 16 rapidly cools the copper powder having been converted to a gas phase state through the thermal plasma flame 24, thereby obtaining the primary fine particles 15 of copper. Besides, the cooling gas has additional functions such as contribution to classification of the primary fine particles 15 in the cyclone 19. The cooling gas is, for instance, argon gas.

When the primary fine particles 15 of copper having just been produced collide with each other to form agglomerates, this causes nonuniform particle size, resulting in lower quality. However, dilution of the primary fine particles 15 with the mixed gas which is supplied as the cooling gas in the direction of arrow Q toward the tail portion (terminating portion) of the thermal plasma flame prevents the fine particles from colliding with each other to agglomerate together.

In addition, the mixed gas supplied as the cooling gas in the direction of arrow R prevents the primary fine particles 15 from adhering to the inner wall 16a of the chamber 16 in the process of collecting the primary fine particles 15, whereby the yield of the produced primary fine particles 15 is improved.

Hydrogen gas may be added to argon gas used as the cooling gas. In this case, a second gas supply source (not shown) and a pressure control valve (not shown) that controls the amount of gas supply are further provided, and hydrogen gas is stored in the second gas supply source. For instance, hydrogen gas may be supplied by a predetermined amount in at least one of the directions of arrow Q and arrow R.

The acid supply section 17 is configured to supply an organic acid to the primary fine particles 15 of copper having been rapidly cooled by the cooling gas and thereby obtained. An organic acid supplied to a higher temperature region than the decomposition temperature of the organic acid is thermally decomposed and, on the primary fine particles 15 produced by rapidly cooling the thermal plasma having a temperature of about 10,000° C., the organic acid is deposited as an organic substance containing hydrocarbon (CnHm) and either a carboxyl group (—COOH) or a hydroxyl group (—OH) that provides hydrophilicity and acidity. Consequently, copper fine particles having acidic properties can be obtained.

The acid supply section 17 may have any configuration as long as it can provide an organic acid to the primary fine particles 15 of copper. For instance, an aqueous organic acid solution is used, and the acid supply section 17 sprays the aqueous organic acid solution into the chamber 16.

The acid supply section 17 includes a container (not shown) storing an aqueous organic acid solution (not shown) and a spray gas supply section (not shown) for converting the aqueous organic acid solution in the container into droplets. The spray gas supply section converts an aqueous solution into droplets using spray gas, and an aqueous organic acid solution AQ converted into droplets is supplied to the primary fine particles 15 of copper in the chamber 16.

For the aqueous organic acid solution, pure water is used as the solvent, for instance. The organic acid is soluble in water, preferably has a low boiling point, and is preferably constituted of C, O and H only. Examples of the organic acid that may be used include L-ascorbic acid ($C_6H_8O_6$), formic acid ($CH_2O_2$), glutaric acid ($C_5H_8O_4$), succinic acid ($C_4H_6O_4$), oxalic acid ($C_2H_2O_4$), DL-tartaric acid ($C_4H_6O_6$), lactose monohydrate, maltose monohydrate, maleic acid ($C_4H_4O_4$), D-mannite ($C_6H_{14}O_6$), citric acid ($C_6H_8O_7$), malic acid ($C_4H_6O_5$) and malonic acid ($C_3H_4O_4$). The use of at least one of the foregoing organic acids is preferred.

For the spray gas used to convert the aqueous organic acid solution into droplets, argon gas is adopted for instance, but the spray gas is not limited to argon gas and may be inert gas such as nitrogen gas.

As shown in FIG. 1, the cyclone 19 is provided to the chamber 16 to classify the primary fine particles 15 of copper having been supplied with the organic acid, based on a desired particle size. The cyclone 19 includes an inlet tube 19a which supplies the primary fine particles 15 from the chamber 16, a cylindrical outer tube 19b connected to the inlet tube 19a and positioned at an upper portion of the cyclone 19, a truncated conical part 19c continuing downward from the bottom of the outer tube 19b and having a gradually decreasing diameter, a coarse particle collecting chamber 19d connected to the bottom of the truncated conical part 19c for collecting coarse particles having a particle size equal to or larger than the above-mentioned desired particle size, and an inner tube 19e connected to the collecting section 20 to be detailed later and projecting from the outer tube 19b.

A gas stream containing the primary fine particles 15 is blown in from the inlet tube 19a of the cyclone 19 along the inner peripheral wall of the outer tube 19b, and this gas stream flows in the direction from the inner peripheral wall of the outer tube 19b toward the truncated conical part 19c as indicated by arrow T in FIG. 1, thus forming a downward swirling stream.

When the downward swirling stream is inverted to an upward stream, coarse particles cannot follow the upward stream due to the balance between the centrifugal force and drag, fall down along the lateral surface of the truncated conical part 19c and are collected in the coarse particle collecting chamber 19d. Fine particles having been affected by the drag more than the centrifugal force are discharged to the outside of the system through the inner tube 19e along with the upward stream on the inner wall of the truncated conical part 19c.

The apparatus is configured such that a negative pressure (suction force) is exerted from the collecting section 20 to be detailed later through the inner tube 19e. The apparatus is also configured such that, under the negative pressure (suction force), the copper fine particles separated from the swirling gas stream are sucked as indicated by arrow U and sent to the collecting section 20 through the inner tube 19e.

On the extension of the inner tube 19e which is an outlet for the gas stream in the cyclone 19, the collecting section 20 for collecting the secondary fine particles (copper fine particles) 18 having a desired particle size on the order of nanometers is provided. The collecting section 20 includes a collecting chamber 20a, a filter 20b provided in the collecting chamber 20a, and a vacuum pump 30 connected through a pipe provided at a lower portion of the collecting chamber 20a. The fine particles sent from the cyclone 19 are sucked by the vacuum pump 30 to be drawn into the collecting chamber 20a, remain on the surface of the filter 20b, and collected.

It should be noted that the number of cyclones used in the production apparatus 10 is not limited to one and may be two or more.

Next, one example of the method of producing copper fine particles using the production apparatus 10 above is described below.

First, for example, copper powder having an average particle size of not more than 5 μm is charged into the material supply device 14 as the raw material powder of the copper fine particles.

For example, argon gas and hydrogen gas are used as the plasma gas, and a high frequency voltage is applied to the coil 12b for high frequency oscillation to generate the thermal plasma flame 24 in the plasma torch 12.

Further, for instance, argon gas is supplied as the cooling gas in the direction of arrow Q from the gas supply device to the tail portion of the thermal plasma flame 24, i.e., the terminating portion of the thermal plasma flame 24. At that time, argon gas is also supplied as the cooling gas in the direction of arrow R.

Next, the copper powder is transported with gas, e.g., argon gas used as the carrier gas and supplied to the thermal plasma flame 24 in the plasma torch 12 through the supply tube 14a. The copper powder supplied is evaporated in the thermal plasma flame 24 to be converted into a gas phase state and is rapidly cooled with the cooling gas, thus producing the primary fine particles 15 of copper (copper fine particles). Further, the acid supply section sprays the aqueous organic acid solution in a droplet form to the primary fine particles 15 of copper.

Then, the primary fine particles 15 of copper thus obtained in the chamber 16 are blown in through the inlet tube 19a of the cyclone 19 together with a gas stream along the inner peripheral wall of the outer casing 19b, and accordingly, this gas stream flows along the inner peripheral wall of the outer casing 19b as indicated by arrow T in FIG. 1, thus forming a swirling stream which goes downward. When the downward swirling stream is inverted to an upward stream, coarse particles cannot follow the upward stream due to the balance between the centrifugal force and drag, fall down along the lateral surface of the truncated conical part 19c and are collected in the coarse particle collecting chamber 19d. Fine particles having been affected by the drag more than the centrifugal force are discharged from the inner wall to the outside of the system along with the upward stream on the inner wall of the truncated conical part 19c.

Due to the negative pressure (suction force) applied by the vacuum pump 30 through the collecting section 20, the discharged secondary fine particles (copper fine particles) 18 are sucked in the direction indicated by arrow U in FIG. 1 and sent to the collecting section 20 through the inner tube 19e to be collected on the filter 20b of the collecting section 20. The internal pressure of the cyclone 19 at this time is preferably equal to or lower than the atmospheric pressure. For the particle size of the secondary fine particles (copper fine particles) 18, an arbitrary particle size on the order of nanometers is specified according to the intended purpose.

Thus, the copper fine particles that are acidic can be easily and reliably obtained by merely subjecting the copper powder to plasma treatment and, for instance, spraying an aqueous organic acid solution thereto.

While the primary fine particles of copper are formed using a thermal plasma flame, the primary fine particles of copper may be formed by a gas-phase process. Thus, the method of producing the primary fine particles of copper is not limited to the one using a thermal plasma flame as long as it is a gas-phase process, and may alternatively be one using a flame process.

Furthermore, the copper fine particles produced by the method of producing copper fine particles according to this embodiment have a narrow particle size distribution, in other words, have a uniform particle size, and coarse particles of 1 μm or more are hardly included.

The flame process herein is a method of synthesizing fine particles by using a flame as the heat source and putting a copper-containing raw material through the flame. In the flame process, the copper-containing raw material is supplied to a flame, and then cooling gas is supplied to the flame to decrease the flame temperature and thereby suppress the growth of copper particles, thus obtaining the primary fine particles 15 of copper. In addition, an organic acid is supplied to the primary fine particles 15 to thereby produce the copper fine particles.

For the cooling gas and the organic acid, the same gases and acids as those mentioned for the thermal plasma flame described above can be used.

Next, the copper fine particles are described.

Figure 2:
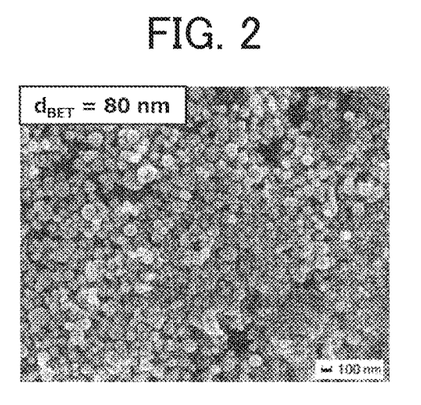
FIG. 2 is a schematic view showing the copper fine particles of the invention.
Figure 3A:
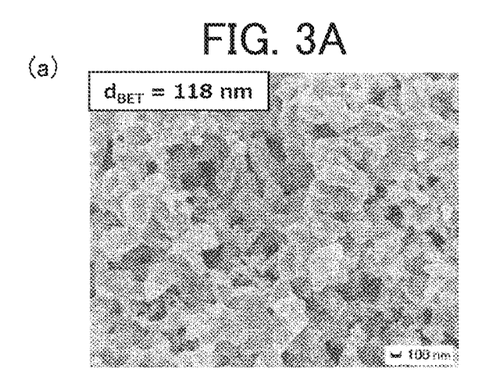
FIG. 3A is a schematic view showing the copper fine particles of the invention having been retained in a nitrogen atmosphere with an oxygen concentration of 3 ppm at a temperature of 400° C. for 1 hour.
Figure 3B:
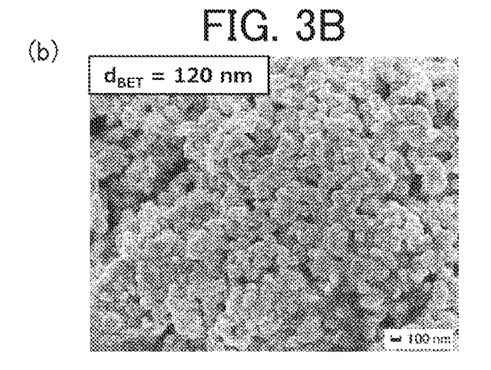
FIG. 3B is a schematic view showing the copper fine particles of the invention having been retained in a nitrogen atmosphere with an oxygen concentration of 100 ppm at a temperature of 400° C. for 1 hour.

FIG. 2 is a schematic view showing the copper fine particles of the invention. FIG. 3A is a schematic view showing the copper fine particles of the invention having been retained in a nitrogen atmosphere with an oxygen concentration of 3 ppm at a temperature of 400° C. for 1 hour; and FIG. 3B is a schematic view showing the copper fine particles of the invention having been retained in a nitrogen atmosphere with an oxygen concentration of 100 ppm at a temperature of 400° C. for 1 hour.

The copper fine particles have a particle size of 10 to 100 nm and have surface coating. When the copper fine particles are retained in an oxygen-containing atmosphere at a temperature of 400° C. for 1 hour, the particle size thereof exceeds 100 nm while the copper condition is maintained. The above particle size of 10 to 100 nm is the size in the state where the particles have not been retained at a temperature corresponding to a baking temperature, that is, in the state where there is no thermal history, and is the size before the particles are retained in an oxygen-containing atmosphere at a temperature of 400° C. for 1 hour. The above particle size of 10 to 100 nm is preferably 10 to nm. The expression "while the copper condition is maintained" refers to the state where copper is not oxidized and the color of copper is kept even when the particles are retained in an oxygen-containing atmosphere at a temperature of 400° C. for 1 hour. The baking temperature refers to the temperature in a baking furnace.

The surface coating is constituted of an organic substance that is generated by thermal decomposition of the organic acid and that contains hydrocarbon (CnHm) and either a carboxyl group (—COOH) or a hydroxyl group (—OH) which provides hydrophilicity and acidity. For example, the surface coating is constituted of an organic substance generated by thermal decomposition of citric acid. The surface condition of the fine particles can be examined using, for instance, an FT-IR (Fourier transform infrared spectrometer).

Before being retained in an oxygen-containing atmosphere at a temperature of 400° C. for 1 hour, the copper fine particles assume, for instance, the form shown in FIG. 2, and the particle size thereof is, for instance, 80 nm.

The oxygen-containing atmosphere stated above is a nitrogen atmosphere with an oxygen concentration of 3 to 100 ppm. The use of high-purity nitrogen gas is not necessary as long as the nitrogen atmosphere has an oxygen concentration of 3 to 100 ppm, and for instance, nitrogen gas obtained using a commercial nitrogen gas generator can be used for the oxygen-containing atmosphere.

The copper fine particles of the invention are those called nanoparticles, and the particle size stated above is the average particle size measured using the BET method. The copper fine particles of the invention are produced by, for instance, the production method described above and obtained in a particulate form. The copper fine particles of the invention are not present in a dispersed form in a solvent or the like but present alone. Therefore, there is no particular limitation on the combination of a solvent and the like, and the degree of freedom is high in selection of a solvent.

The copper fine particles have a particle size of 80 nm in the example shown in FIG. 2, as described above. When the particles are retained in, as the oxygen-containing atmosphere, for instance, a nitrogen gas atmosphere with an oxygen concentration of 3 ppm at a temperature of 400° C. for 1 hour, the growth of the particles by sintering occurs as shown in FIG. 3A, and the particle size is 118 nm.

Besides, when the particles are retained in, as the oxygen-containing atmosphere, for instance, a nitrogen gas atmosphere with an oxygen concentration of 100 ppm at a temperature of 400° C. for 1 hour, the growth of the particles by sintering occurs as shown in FIG. 3B, and the particle size is 120 nm. Although not illustrated, the copper fine particles of FIG. 3A and those of 3B are not discolored to black and have the copper color. Thus, the copper fine particles of the invention have excellent oxidation resistance, so that even when the particles are retained at a baking temperature in an oxygen-containing atmosphere, the state of copper can be maintained without oxidation while the particles are sintered and grow to 100 nm or more.

The copper fine particles of the invention can be produced using the production apparatus 10 described above and, as the organic acid, citric acid.

Specifically, the production conditions of the copper fine particles are as follows. Plasma gas: argon gas (200 liters/minute), hydrogen gas (5 liters/minute); carrier gas: argon gas (5 liters/minute); rapidly-cooling gas: argon gas (150 liters/minute); internal pressure: 40 kPa.

For the citric acid, pure water is used as the solvent to form an aqueous solution containing citric acid (citric acid concentration: 15 W/W %), which is to be sprayed to the primary fine particles of copper with the spray gas. The spray gas is argon gas.

Figure 4:
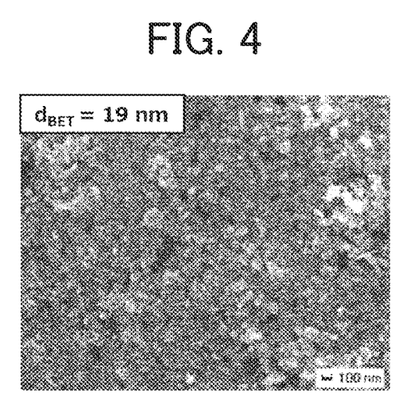
FIG. 4 is a schematic view showing copper fine particles of Conventional Example 1.
Figure 5A:
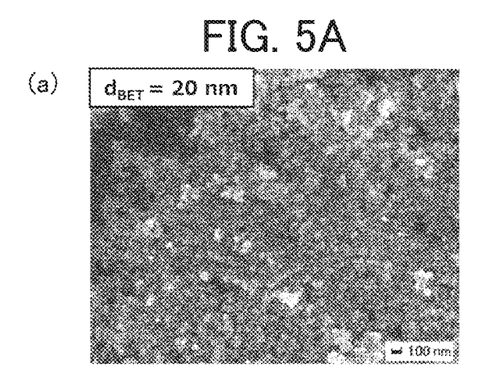
FIG. 5A is a schematic view showing the copper fine particles of Conventional Example 1 having been retained in a nitrogen atmosphere with an oxygen concentration of 3 ppm at a temperature of 400° C. for 1 hour.
Figure 5B:
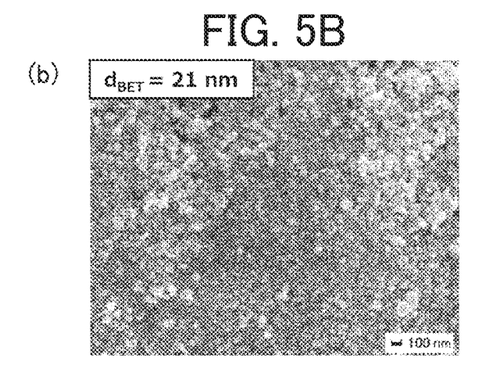
FIG. 5B is a schematic view showing the copper fine particles of Conventional Example 1 having been retained in a nitrogen atmosphere with an oxygen concentration of 100 ppm at a temperature of 400° C. for 1 hour.

FIG. 4 is a schematic view showing copper fine particles of Conventional Example 1. FIG. 5A is a schematic view showing the copper fine particles of Conventional Example 1 having been retained in a nitrogen atmosphere with an oxygen concentration of 3 ppm at a temperature of 400° C. for 1 hour; and FIG. 5B is a schematic view showing the copper fine particles of Conventional Example 1 having been retained in a nitrogen atmosphere with an oxygen concentration of 100 ppm at a temperature of 400° C. for 1 hour.

The copper fine particles of Conventional Example 1 shown in FIG. 4 have a particle size of 19 nm. For instance, when the particles are retained in a nitrogen gas atmosphere with an oxygen concentration of 3 ppm at a temperature of 400° C. for 1 hour, the growth of the particles is not seen as shown in FIG. 5A, and the particle size is 21 nm. In addition, for instance, when the particles are retained in a nitrogen gas atmosphere with an oxygen concentration of 100 ppm at a temperature of 400° C. for 1 hour, the growth of the particles is not seen as shown in FIG. 5B, and the particle size is 22 nm. Thus, when the copper fine particles of Conventional Example 1 are retained at a baking temperature in an oxygen-containing atmosphere, the growth of the particles by sintering does not occur with high oxidation resistance being kept.

The copper fine particles of Conventional Example 1 can be produced by the same production method as that of the copper fine particles of the invention except that the cooling gas is a mixed gas of argon gas and methane gas.

Table 1 below provides the volume resistivities of pellets made of the copper fine particles of the invention, which pellets have been separately retained in nitrogen atmospheres with oxygen concentrations of 3 ppm and 100 ppm at a temperature of 300° C. for 1 hour. The pellets were made by pressing at 127 MPa for 1 minute with a pressing machine. The volume resistivies were measured by a four-terminal, four-point-probe method.

TABLE 1

| Baking temperature | 300° C. | |
| Baking time | 1 hour | |
| Oxygen concentration | 3 ppm | 100 ppm |
| Volume resistivity before baking (Ωcm) | 10.3 | 16.9 |
| Volume resistivity after baking (Ωcm) | $3.45 \times 10^{-5}$ | $3.95 \times 10^{-5}$ |

As described above, the copper fine particles of the invention grow and are not oxidized, and therefore, can be favorably utilized for conductors such as conductive wires, for example. In contrast, the copper fine particles of Conventional Example 1 are not oxidized but do not grow, and therefore, are not favorable for conductors such as conductive wires, for example.

Figure 6:
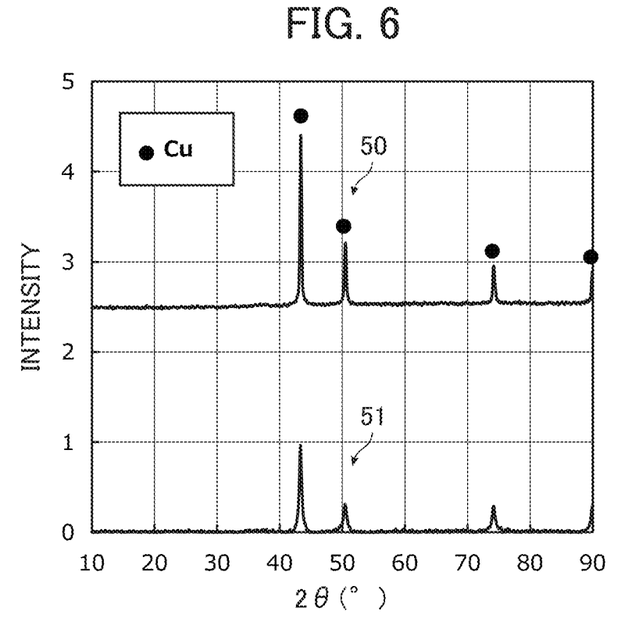
FIG. 6 is a graph showing analysis results of crystal structures of the copper fine particles of the invention and the copper fine particles of Conventional Example 1 as obtained by X-ray diffractometry.
Figure 7:
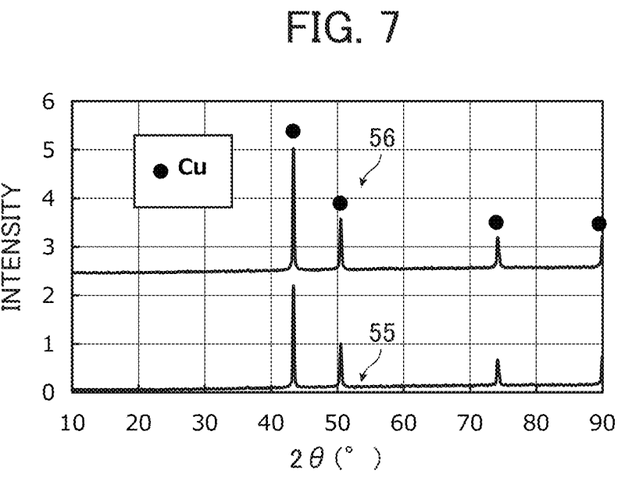
FIG. 7 is a graph showing analysis results of crystal structures of the copper fine particles of the invention having been retained in a nitrogen atmosphere with an oxygen concentration of 3 ppm at a temperature of 400° C. for 1 hour and the copper fine particles of the invention having been retained in a nitrogen atmosphere with an oxygen concentration of 100 ppm at a temperature of 400° C. for 1 hour as obtained by X-ray diffractometry.

FIG. 6 is a graph showing analysis results of crystal structures of the copper fine particles of the invention and the copper fine particles of Conventional Example 1 as obtained by X-ray diffractometry. FIG. 7 is a graph showing analysis results of crystal structures of the copper fine particles of the invention having been retained in a nitrogen atmosphere with an oxygen concentration of 3 ppm at a temperature of 400° C. for 1 hour and the copper fine particles of the invention having been retained in a nitrogen atmosphere with an oxygen concentration of 100 ppm at a temperature of 400° C. for 1 hour as obtained by X-ray diffractometry.

Numeral 50 in FIG. 6 represents a graph showing an analysis result of the crystal structure of the copper fine particles of the invention as obtained by X-ray diffractometry. Numeral 51 represents a graph showing an analysis result of the crystal structure of the copper fine particles of Conventional Example 1 as obtained by X-ray diffractometry.

As shown in FIG. 6, the copper fine particles of the invention and the copper fine particles of Conventional Example 1 have their diffraction peaks at the same positions.

Numeral 55 in FIG. 7 represents a graph showing an analysis result of the crystal structure of the copper fine particles of the invention having been retained in a nitrogen atmosphere with an oxygen concentration of 3 ppm at a temperature of 400° C. for 1 hour as obtained by X-ray diffractometry, and numeral 56 represents a graph showing an analysis result of the crystal structure of the copper fine particles of the invention having been retained in a nitrogen atmosphere with an oxygen concentration of 100 ppm at a temperature of 400° C. for 1 hour as obtained by X-ray diffractometry.

In both cases of a nitrogen atmosphere with an oxygen concentration of 3 ppm and that with an oxygen concentration of 100 ppm, the oxidation is suppressed even when the particles are retained at a temperature of 400° C. for 1 hour, the state of copper is maintained, and thus, oxidation resistance is excellent. Therefore, the copper fine particles can be sintered without reduction gas such as hydrogen, and an atmosphere for baking the copper fine particles can be easily controlled.

Figure 8:
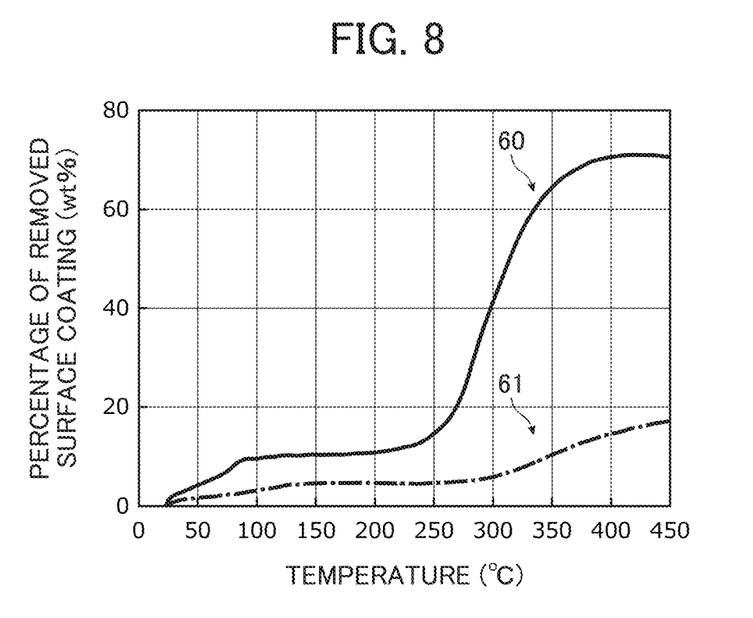
FIG. 8 is a graph showing the percentages of removed surface coating on the copper fine particles of the invention and that on the copper fine particles of Conventional Example 1 in a nitrogen atmosphere with an oxygen concentration of 3 ppm.

FIG. 8 is a graph showing the percentages of removed surface coating on the copper fine particles of the invention and that on the copper fine particles of Conventional Example 1 in a nitrogen atmosphere with an oxygen concentration of 3 ppm at each temperature. Numeral in FIG. 8 represents the copper fine particles of the invention, and numeral 61 represents the copper fine particles of Conventional Example 1. FIG. 8 is provided based on the results obtained with a Thermogravimetry differential thermal analyzer (TG-DTA). As shown in FIG. 8, the surface coating of the copper fine particles of the invention (see the line of numeral 60) is removed more. It is presumable from this that contacting portions of the copper fine particles had a small amount of organic substances and the particles grew in the state of being retained, for example, at a temperature of 400° C. for 1 hour. As shown in FIG. 8, when the particles are baked in a nitrogen atmosphere with an oxygen concentration of 3 ppm, not less than 60 wt % of the surface coating is removed at 350° C.

The copper fine particles of the invention can be favorably used alone for conductors such as conductive wires, but the invention is not limited thereto. For instance, when a conductor such as a conductive wire is produced, the copper fine particles may be mixed with copper particles with a particle size on the order of micrometers to serve as a sintering aid for the copper particles. Alternatively, the copper fine particles may be utilized for, in addition to conductors such as conductive wires, those required to have electrical conductivity, and for example, can be used in bonding between semiconductor devices, between a semiconductor device and any of various electronic devices, and between a semiconductor device and a wiring layer.

The present invention is basically configured as above. While the method of producing copper fine particles and copper fine particles according to the invention are described above in detail, the invention is by no means limited to the foregoing embodiment and it should be understood that various improvements and modifications are possible without departing from the scope and spirit of the invention.

REFERENCE SIGNS LIST

10 fine particle producing apparatus
12 plasma torch
14 material supply device
15 primary fine particle
16 chamber
17 acid supply section
18 secondary fine particle
19 cyclone
20 collecting section
22 plasma gas supply source
22a first gas supply section
22b second gas supply section
24 thermal plasma flame
28 gas supply device
28a first gas supply source
30 vacuum pump
AQ aqueous solution

The invention claimed is:

1. Copper fine particles with a particle size of 10 to 90 nm and having a surface coating,
   wherein the surface coating comprises an organic substance generated by thermal decomposition of an organic acid,
   wherein the organic acid is citric acid, and
   wherein when the copper fine particles are retained in an oxygen-containing atmosphere at a temperature of 400° C. for 1 hour, the particle size of the copper fine particles exceeds 100 nm while a copper condition is maintained,
   wherein when a pellet is made by pressing the copper fine particles at 127 MPa for 1 minute and retained in an oxygen-containing atmosphere at a temperature of 300° C. for 1 hour, a volume resistivity of the pellet becomes not more than $4.0 \times 10^{-5}$ ($\Omega$cm).

2. The copper fine particles according to claim 1, wherein when the copper fine particles are baked in a nitrogen atmosphere with an oxygen concentration of 3 ppm, not less than 60 wt % of the surface coating is removed at 350° C.

3. The copper fine particles according to claim 2, wherein the oxygen-containing atmosphere is a nitrogen atmosphere with an oxygen concentration of 3 to 100 ppm.

4. The copper fine particles according to claim 1, wherein the oxygen-containing atmosphere is a nitrogen atmosphere with an oxygen concentration of 3 to 100 ppm.

* * * * *